US011294242B2

(12) United States Patent
Huang

(10) Patent No.: US 11,294,242 B2
(45) Date of Patent: Apr. 5, 2022

(54) DISPLAY PANEL, DISPLAY DEVICE, AND MANUFACTURING METHOD

(71) Applicant: HKC CORPORATION LIMITED, Shenzhen (CN)

(72) Inventor: Shishuai Huang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 122 days.

(21) Appl. No.: 16/349,983

(22) PCT Filed: Nov. 27, 2018

(86) PCT No.: PCT/CN2018/117663
§ 371 (c)(1),
(2) Date: May 15, 2019

(87) PCT Pub. No.: WO2020/087609
PCT Pub. Date: May 7, 2020

(65) Prior Publication Data
US 2021/0333642 A1 Oct. 28, 2021

(30) Foreign Application Priority Data

Oct. 30, 2018 (CN) .......................... 201811273638.7

(51) Int. Cl.
*G02F 1/1337* (2006.01)
*G02F 1/1343* (2006.01)
(52) U.S. Cl.
CPC .. *G02F 1/133757* (2021.01); *G02F 1/134345* (2021.01)

(58) Field of Classification Search
None
See application file for complete search history.

(56) References Cited

U.S. PATENT DOCUMENTS

| 2008/0316413 | A1  | 12/2008 | Cho                  |
| 2010/0207852 | A1* | 8/2010  | Cok ........... H01L 27/3213 345/83 |
| 2012/0268357 | A1* | 10/2012 | Shih ........... G09G 3/3648 345/88 |

(Continued)

FOREIGN PATENT DOCUMENTS

| CN | 102749751 A | 10/2012 |
| CN | 103901682 A | 7/2014  |

(Continued)

OTHER PUBLICATIONS

International Search Report issued in corresponding International application No. PCT/CN2018/117663, dated Jul. 25, 2019.

(Continued)

*Primary Examiner* — Phu Vu

(57) ABSTRACT

This application discloses a display panel, a display device, and a manufacturing method. The display panel includes: a plurality of first pixels and a plurality of second pixels, where colors of the first pixel differ from colors of the second pixel; and the first pixel is configured to be a high domain, the second pixel is configured to be a low domain, and the number of alignment regions of the high domain is greater than the number of alignment regions of the low domain.

18 Claims, 5 Drawing Sheets

(56) References Cited

U.S. PATENT DOCUMENTS

2016/0246108 A1* 8/2016 Hsu .................. G02F 1/134309
2016/0315127 A1* 10/2016 Yoon ................. G02F 1/134309

FOREIGN PATENT DOCUMENTS

| CN | 104460077 A | 3/2015 |
| CN | 104701354 A | 6/2015 |
| CN | 105529008 A | 4/2016 |

OTHER PUBLICATIONS

Written Opinion of the International Searching Authority for No. PCT/CN2018/117663.
First Office Action from China patent office in a counterpart Chinese patent Application 201811273638.7 dated Aug. 5, 2020 (6 pages).

* cited by examiner

S91 — Form a pixel electrode of a first pixel and a pixel electrode of a second pixel on a first substrate of a display panel; and form a color photoresist layer corresponding to the first pixel and the second pixel on a second substrate of the display panel.

S92 — Form a plurality of first pixels and a plurality of second pixels, where colors corresponding to the first pixels and the second pixels differ from each other.

FIG. 7

100 Display device

110 Display panel

FIG. 8

DISPLAY PANEL, DISPLAY DEVICE, AND MANUFACTURING METHOD

This application claims the priority to the Chinese Patent Application No. CN201811273638.7, filed with National Intellectual Property Administration, PRC on Oct. 30, 2018 and entitled "DISPLAY PANEL, DISPLAY DEVICE, AND MANUFACTURING METHOD", which is incorporated herein by reference in its entirety.

TECHNICAL FIELD

This application relates to the technical field of display, and in particular, to a display panel, a display device, and a manufacturing method.

BACKGROUND

The description herein provides only background information related to this application, but does not necessarily constitute the existing technology.

With the development and progress of science and technology, liquid crystal displays are displays more widely used in the market at present, and in particular, widely applied to liquid crystal televisions.

As the resolution of a display panel improves gradually, dimensions of a pixel may become smaller and smaller, an aperture ratio may also become smaller increasingly, and the backlight luminance needs to be improved significantly, so as to satisfy luminance requirements. For backlight with high luminance, there is a need of increasing power, so that there may be more power consumption, corresponding cost may also increase, and meanwhile, the power consumption of the environment becomes large, which is disadvantages to environmental protection. Therefore, liquid crystal displays with high resolution require high transmittance to reduce the power consumption and cost of backlight. Color shift may occur at a large view angle.

SUMMARY

The purpose of this application is to provide a display panel, a display device, and a manufacturing method, so as to alleviate and even eliminate color shift of the display panel.

This application provides a display panel, including:
a plurality of first pixels and a plurality of second pixels, wherein colors of the plurality of first pixels are the same, colors of the plurality of second pixels are the same, but the colors of the first pixels differ from the colors of the second pixels; and the first pixel is configured to be a high domain, the second pixel is configured to be a low domain, and the number of alignment regions of the high domain is greater than the number of alignment regions of the low domain.

Optionally, the display panel includes a gate scanning layer and a common line, the second pixel includes a main pixel and a secondary pixel, and a corresponding first pixel in the same gate scanning layer is provided with three thin film transistors, wherein drain electrodes of two of the thin film transistors are connected with the main pixel and the secondary pixel respectively, and source electrodes are connected with the same data line; and a source electrode of another one of the thin film transistors is connected with the secondary pixel in the previous gate scanning layer, and a drain electrode is connected with the common line.

Optionally, the luminance of the first pixel is lower than the luminance of the second pixel.

Optionally, the display panel includes a blue pixel, which is the first pixel and configured to be a high domain correspondingly.

Optionally, the display panel further includes a third pixel, which is configured to be a low domain correspondingly.

Optionally, the first pixel is a blue pixel, the second pixel is a red pixel, the third pixel is a green pixel, the blue pixel is configured to be a high domain correspondingly, the red pixel is configured to be a low domain correspondingly, and the green pixel is configured to be a low domain correspondingly.

Optionally, the display panel further includes a third pixel, which is configured to be a high domain correspondingly; and the first pixel is a blue pixel, the second pixel is a red pixel, the third pixel is a green pixel, the blue pixel is configured to be a high domain correspondingly, the red pixel is configured to be a low domain correspondingly, and the green pixel is configured to be a high domain correspondingly.

Optionally, the display panel includes a third pixel and a fourth pixel, the blue pixel is the first pixel and configured to be a high domain correspondingly, and the second pixel, the third pixel, and the fourth pixel are configured to be low domains correspondingly.

Optionally, the low domain has four alignment regions, and the high domain has eight alignment regions.

This application further discloses a manufacturing method for a display panel, including:
providing a plurality of first pixels and a plurality of second pixels, wherein colors corresponding to the first pixel and the second pixel differ from each other, and wherein the first pixel is configured to be a high domain, the second pixel is configured to be a low domain, and the number of alignment regions of the high domain is greater than the number of alignment regions of the low domain.

Optionally, the step of providing a plurality of first pixels and a plurality of second pixels includes:
providing a pixel electrode of the first pixel and a pixel electrode of the second pixel on a first substrate of the display panel; and
providing a color photoresist layer corresponding to the first pixel and the second pixel on a second substrate of the display panel.

This application further provides a display device, including the display panel described above.

In this solution, the display panel includes a first pixel and a second pixel, both of which are multiple, the first pixel is configured to be a high domain correspondingly, and the second pixel is configured to be a low domain correspondingly. Since the number of alignment regions of the first pixel differs from that of the second pixel, for the solution that both the first pixel and the second pixel are configured to be high domains, the number of alignment regions of the high domain is larger, a view angle configured for the high domain is good, and the configuration of high domain may reduce an opening area and thus sacrifice an aperture ratio; and for the solution that both the first pixel and the second pixel are configured to be low domains, the configuration of low domain enables the opening area to be relatively larger and thus the aperture ratio to be higher, but the view angle may be worse, and the customer experience may be poor. In this application, the high domain and the low domain are configured in a mixed and cooperated manner, the configuration of low domain guarantees certain transmittance, while the configuration of high domain alleviates the problem of color shift at a large view angle, so that the high domain and the low domain are provided in a mixed and cooperated manner, thereby alleviating the color shift and improving the quality of the display panel in the case of the large view angle of a product while ensuring certain transmittance.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Apparently, the accompanying drawings in the following description merely show some embodiments of this application, and persons of ordinary skill in the art may still derive other drawings from these accompanying drawings without creative effort. In the figures:

FIG. 7 is a flow chart of a manufacturing method for a display panel of one of the embodiments of this application.

FIG. 8 is a schematic diagram of a display device of one of the embodiments of this application.

DETAILED DESCRIPTION

Figure 1:
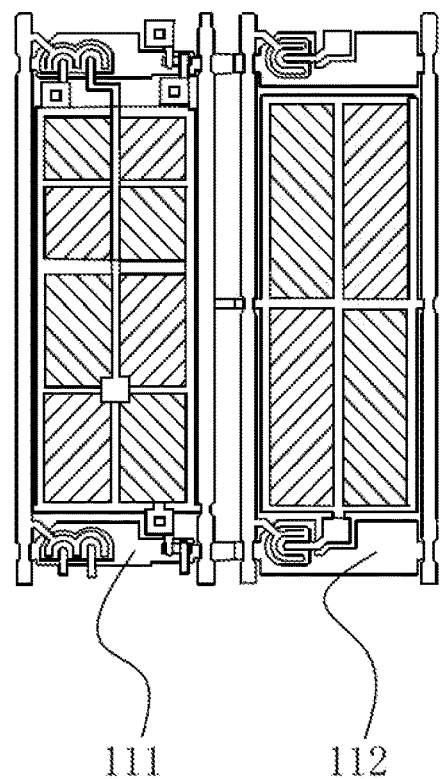
FIG. 1 is a schematic diagram of a display panel of one of the embodiments of this application with a first pixel configured to be a high domain and a second pixel configured to be a low domain.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below" "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

Liquid crystal displays are displays more widely used in the market at present, and in particular, widely applied to liquid crystal televisions. As the resolution improves gradually, dimensions of a pixel may become smaller and smaller, an aperture ratio may also become smaller increasingly, and the backlight luminance needs to be improved significantly as well, so as to satisfy luminance requirements. For backlight with high luminance, there is a need of increasing power, so that there may be more power consumption, corresponding cost may also increase, and meanwhile, the power consumption of the environment becomes large, which is disadvantages to environmental protection. Therefore, liquid crystal displays with high resolution require high transmittance to reduce the power consumption and cost of backlight.

This application is further described below with reference to the accompanying drawings and optional embodiments.

As shown with reference to FIG. 1, an embodiment of this application discloses a display panel 110, including:
a plurality of first pixels 111 and a plurality of second pixels 112, where colors of the plurality of first pixels 111 are the same, colors of the plurality of second pixels 112 are the same, but the colors of the first pixels 111 differ from the colors of the second pixels 112; and the first pixel 111 is configured to be a high domain, the second pixel 112 is configured to be a low domain, and the number of alignment regions of the high domain is greater than the number of alignment regions of the low domain.

In this solution, the display panel 110 includes a first pixel 11 and a second pixel 112, both of which are multiple, the first pixel 111 is configured to be a high domain correspondingly, and the second pixel 112 is configured to be a low domain correspondingly. Since the number of alignment regions of the first pixel 111 differs from that of the second pixel 112, for the solution that both the first pixel 111 and the second pixel 112 are configured to be high domains, the number of alignment regions of the high domain is larger, a view angle configured for the high domain is good, the second pixel 112 includes a main pixel and a secondary pixel, the display panel includes a gate scanning layer and a common line, and a corresponding first pixel in the same gate scanning layer is provided with three thin film transistors, where drain electrodes of two of the thin film transistors are connected with the main pixel and the secondary pixel respectively, and source electrodes are connected with the same data line; and a source electrode of another one of the thin film transistors is connected with the secondary pixel in the previous gate scanning layer, and a drain electrode is connected with the common line. Thin film transistors in the same gate scanning layer are opened at the same time, the main pixel and the secondary pixel are charged at the same time, and charge amounts of the main pixel and the secondary pixel are the same; and when a switch of a thin film transistor in the previous layer is turned off, a thin film transistor in the next layer is turned on, since the secondary pixel in the previous layer has an overlapping area with a common electrode and thus produces a discharging capacitance, the electric quantity of the secondary pixel may lose, and at this point, the voltage of the main pixel is greater than the voltage of the secondary pixel, and the luminance of the secondary pixel is lower than the luminance of the main pixel. According to the characteristics of a VA type, when dimensions of the display panel 110 are large, the luminance on both sides may be larger when viewing from different view angles, so that the circumstance of non-uniform luminance and darkness may occur. The pixel is configured to be a high domain correspondingly so as to perform cooperation, with one that is of higher luminance on both sides cooperating with one that is of lower luminance, thereby alleviating the color shift, and the configuration of high domain may reduce the opening area and thus sacrifice the aperture ratio; and for the solution that both the first pixel 111 and the second pixel 112 are configured to be low domains, the configuration of low domain enables the opening area to be relatively larger and thus the aperture ratio to be higher, but the view angle may be worse, and the customer experience may be poor. In this application, the high domain and the low domain are configured in a mixed and cooperated manner, the configuration of low domain guarantees certain transmittance, while the configuration of high domain alleviates the problem of color shift at a large view angle, so that the high domain and the low domain are provided in a mixed and cooperated manner, thereby alleviating the color shift and improving the quality of the display panel 110 in the case of the large view angle of a product while ensuring certain transmittance.

In one or more embodiments, the luminance of the first pixel 111 is lower than the luminance of the second pixel 112.

In this solution, the first pixel 111 is configured to be a high domain, the second pixel 112 is configured to be a low domain, and the luminance of the first pixel 111 is lower than the luminance of the second pixel 112. In this solution, one with lower luminance is configured to be a high domain, and since the luminance of the pixel with lower luminance itself contributes less to the overall luminance of the panel, the first pixel 111 with lower luminance is configured to be a high domain correspondingly, which, on one hand, has less effect on the overall luminance of the display panel 110, and, on the other hand, may also alleviate the problem of color shift at a large view angle.

Figure 2:
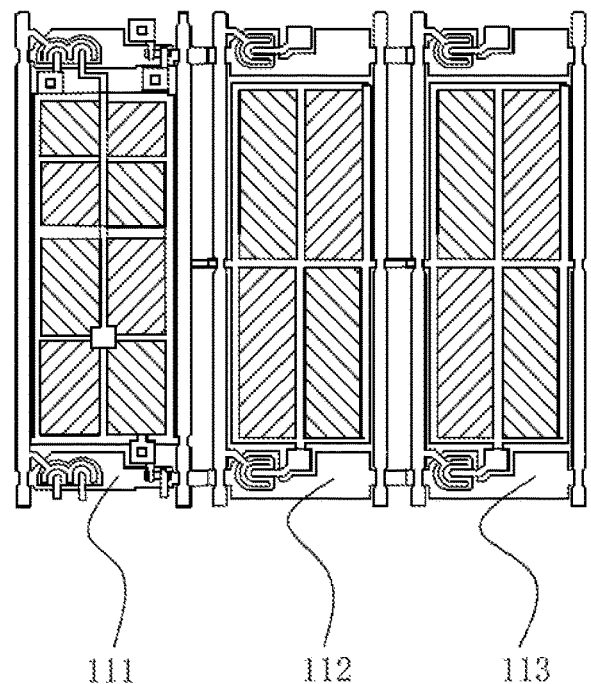
FIG. 2 is a schematic diagram of a display panel of one of the embodiments of this application with a pixel with darker RGB being a high domain.

In one or more embodiments, as shown with reference to FIG. 2, the display panel 110 includes a blue pixel, which is the first pixel 111 and configured to be a high domain correspondingly.

In this solution, the blue pixel is the first pixel 111 and configured to be a high domain correspondingly. Since the pixel with lower luminance has less effect on display of the overall panel, and the luminance of the blue pixel is lower and has less effect on the display of the overall panel, the blue pixel is configured to be a high domain correspondingly, and with the configuration of high domain, the problem of color shift at a large view angle may be alleviated, so that configuring the blue pixel to be a high domain alleviates the problem of color shift.

In one or more embodiments, the display panel 110 further includes a third pixel 113, which is configured to be a low domain correspondingly.

In this solution, the display panel 110 includes the first pixel 111, the second pixel 112, and the third pixel 113, the first pixel 111 is configured to be a high domain correspondingly, and the second pixel 112 and the third pixel 113 are configured to be low domains correspondingly. The display panel 110 includes three pixels, and colors corresponding to the first pixel 111, the second pixel 112, and the third pixel 113 differ from each other. The display panel 110 includes pixels with three different colors, and compared with a pixel with only two different colors, mixing of three colors may enable the color to be more uniform.

In one or more embodiments, the first pixel 111 is a blue pixel, the second pixel 112 is a red pixel, the third pixel 113 is a green pixel, the blue pixel is configured to be a high domain correspondingly, the red pixel is configured to be a low domain correspondingly, and the green pixel is configured to be a low domain correspondingly.

In this solution, the first pixel 111 is a blue pixel and configured to be a high domain correspondingly; the second pixel 112 is a red pixel and configured to be a low domain correspondingly; and the third pixel 113 is a green pixel and configured to be a low domain correspondingly. The luminance ratio of the blue pixel, the red pixel, and the green pixel is 1:2:10, the luminance of the blue pixel is darker among the three pixels, since the pixel with lower luminance has less effect on the display of the overall panel, and the luminance of the blue pixel has less effect on the display of the overall panel, the blue pixel is configured to be a high domain correspondingly, the configuration of high domain may alleviate the color shift, and therefore, configuring the blue pixel to be a high domain may alleviate the color shift. Additionally, mixing of the blue pixel, the red pixel, and the green pixel may enable the color of the display panel 110 to be uniform.

Figure 3:
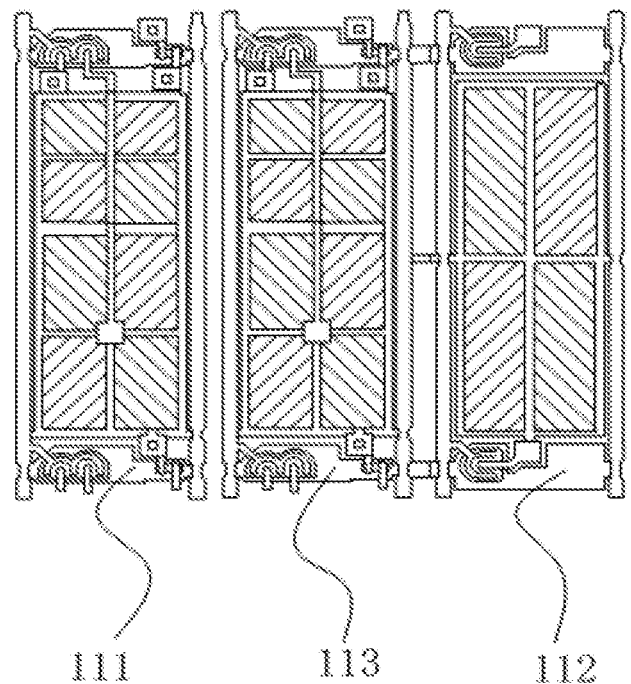
FIG. 3 is a schematic diagram of a display panel of one of the embodiments of this application with pixels with brighter and darker RGB configured to be high domains.

In one or more embodiments, as shown with reference to FIG. 3, the display panel 110 further includes a third pixel 113, which is configured to be a high domain correspondingly; and the first pixel 111 is a blue pixel, the second pixel 112 is a red pixel, the third pixel 113 is a green pixel, the blue pixel is configured to be a high domain correspondingly, the red pixel is configured to be a low domain correspondingly, and the green pixel is configured to be a high domain correspondingly.

In this solution, the display panel 110 includes three pixels, and two high domains and one low domain are configured for the three pixels correspondingly. The display panel 110 includes the first pixel 111, the second pixel 112, and the third pixel 113, the first pixel 111 is a blue pixel, the second pixel 112 is a red pixel, and the third pixel 113 is a green pixel. The blue pixel is configured to be a high domain correspondingly, the red pixel is configured to be a low domain correspondingly, and the green pixel is configured to be a high domain correspondingly. The luminance ratio of the blue pixel, the red pixel, and the green pixel is 1:2:10 correspondingly, and the blue pixel and the green pixel are brighter and darker among the three pixels respectively and both are configured to be high domains correspondingly. The brighter pixel and the darker pixel are both configured to be high domains, the combination of which may enable the overall luminance of the display panel 110 to be uniform, and meanwhile, may also resolve the problem of color shift at a large view angle.

Figure 4:
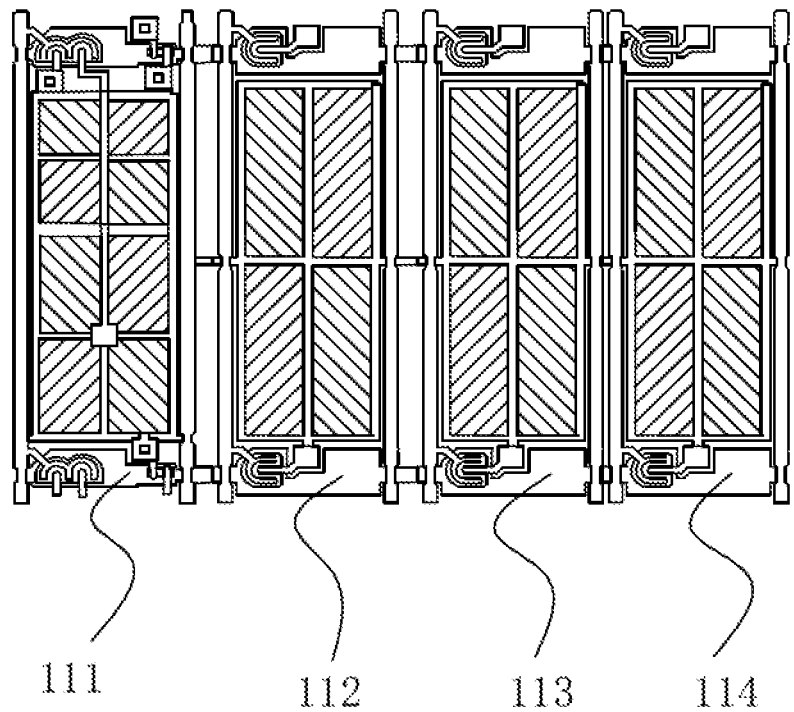
FIG. 4 is a schematic diagram of a display panel of one of the embodiments of this application with pixels with darker or brighter RGBW configured to be high domains.

In one or more embodiments, as shown with reference to FIG. 4, the display panel 110 includes a third pixel 113 and a fourth pixel 114, the blue pixel is the first pixel 111 and configured to be a high domain correspondingly, and the second pixel 112, the third pixel 113, and the fourth pixel 114 are configured to be low domains correspondingly.

In this solution, the display panel 110 includes four pixels, three pixels are configured to be low domains correspondingly and one pixel is configured to be a high domain correspondingly. The first pixel 111 is a blue pixel, the second pixel 112 is a white pixel, the third pixel 113 is a green pixel, and the fourth pixel 114 is a red pixel. For the display panel 110 provided with the white pixel, the white pixel is brighter relative to pixels of other colors, and the addition of the white pixel may improve the overall luminance of the display panel 110, so that the overall transmittance is improved. Configuring the blue pixel to be a high domain correspondingly reduces a small amount of transmittance, and since the addition of the white pixel changes the overall luminance of the display panel 110 less, the overall transmittance of the display panel 110 is affected less. With the addition of the white pixel, the overall transmittance is improved, and meanwhile, the blue pixel is configured to be a high domain correspondingly.

In one or more embodiments, with reference to FIG. 4, the display panel 110 includes the third pixel 113 and the fourth pixel 114, the white pixel is the first pixel 111 and configured to be a high domain correspondingly, and the second pixel 112, the third pixel 113, and the fourth pixel 114 are configured to be low domains correspondingly.

Pixels of the same color are in the same column.

In this solution, the display panel 110 includes four pixels, that is, the first pixel 111, the second pixel 112, the third pixel 113, and the fourth pixel 114, the white pixel is the first pixel 111, the red pixel is the second pixel 112, the green pixel is the third pixel 113, and the blue pixel is the fourth pixel 114. The white pixel is configured to be a high domain correspondingly, pixels of other colors are configured to be low domains, the luminance of the white pixel is larger, with larger ratio in the overall luminance of the display panel 110, the overall transmittance is affected less even if the configuration of high domain reduces a little transmittance, and therefore, the display panel 110 includes four pixels, where one pixel that is of higher luminance is configured to be a high domain, and other three pixels are configured to be low domains.

Figure 5:
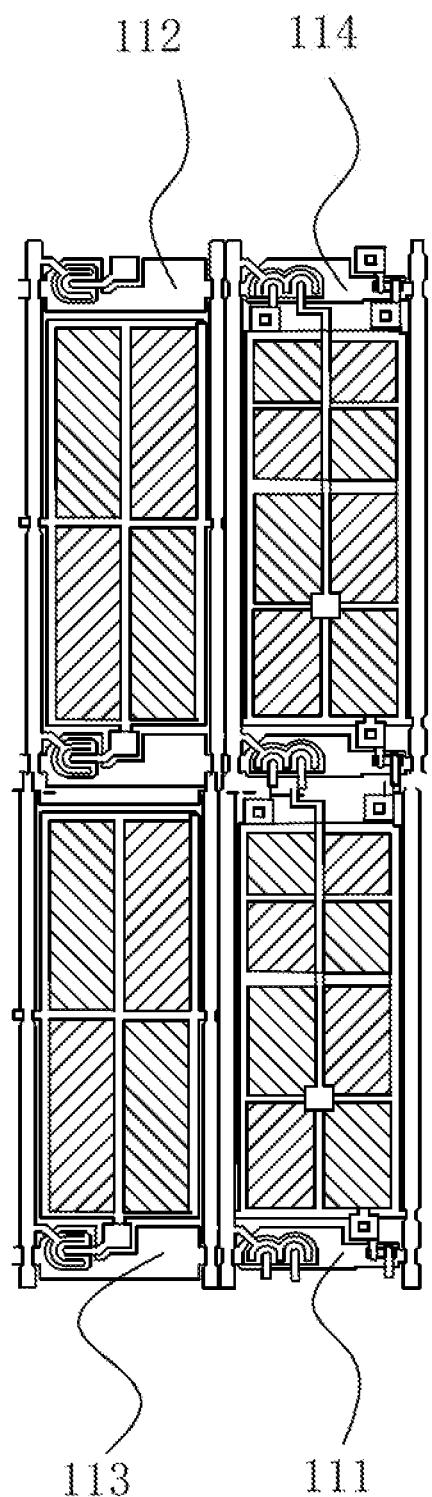
FIG. 5 is a schematic diagram of a display panel of one of the embodiments of this application with RGBW arranged into two rows and two columns.

In one or more embodiments, with reference to FIG. 5, the first pixel 111, the second pixel 112, the third pixel 113, and the fourth pixel 114 belong to a pixel group with two rows and two columns, and in each pixel group, the second pixel 112 and the third pixel 113 are in the same column, the first pixel 111 and the fourth pixel 114 are in the same column, the second pixel 112 and the fourth pixel 114 are in the same row, and the first pixel 111 and the third pixel 113 are in the same row.

The arrangement of rows and columns may also be reverse.

In this solution, the first pixel 111, the second pixel 112, the third pixel 113, and the fourth pixel 114 belong to a pixel group with two rows and two columns. The first pixel 111 and the fourth pixel 114 are arranged in the same column, and the second pixel 112 and the third pixel 113 are arranged in the same column. The white pixel is the first pixel 111, the luminance of the first pixel 111 is higher, the luminance of the fourth pixel 114 is lower, the luminance of the second pixel 112 and that of the third pixel 113 are of intermediate luminance, the first pixel 111 and the fourth pixel 114 are arranged in the same column, that is, the brighter one and the darker one are arranged in the same column, and such arrangement may decentralize the luminance and achieve the effect of uniform display.

Figure 6:
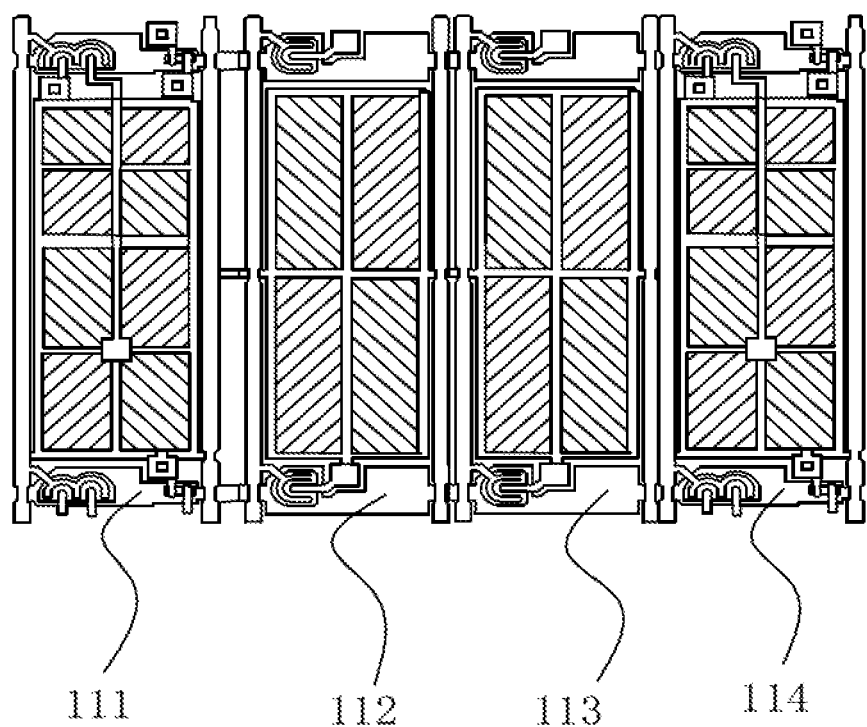
FIG. 6 is a schematic diagram of a display panel of one of the embodiments of this application with RGBW displayed in the same row.

In one or more embodiments, with reference to FIG. 6, the first pixel 111, the second pixel 112, the third pixel 113, and the fourth pixel 114 belong to a pixel group, and in each pixel group, the first pixel 111, the second pixel 112, the third pixel 113, and the fourth pixel 114 are in the same row.

In this solution, the first pixel 111, the second pixel 112, the third pixel 113, and the fourth pixel 114 are in the same row, the same row or column of a mask is of the same number of alignment regions and the same pattern, and the design of the mask is simpler.

In one or more embodiments, the low domain has four alignment regions, and the high domain has eight alignment regions.

RGBW is a design which may improve the transmittance of the panel significantly, and a W photoresist with high transmittance is added to a RGB resist to change the three colors to be four colors. The transmittance of RGBW is improved by 1.5-fold:

$$\tfrac{1}{3}(R)+\tfrac{1}{3}(G)+\tfrac{1}{3}(B)+1(W)=1.5(\tfrac{1}{3}(R)+\tfrac{1}{3}(G)+\tfrac{1}{3}(B)+\tfrac{1}{3}(R)).$$

Dimensions of a liquid crystal screen with high resolution in a vertical alignment (VA) mode are very small, and if eight alignment regions are designed to improve the view angle, the aperture ratio may be further sacrificed.

In this solution, the first pixel 111 is configured to be a high domain correspondingly and has eight alignment regions, and the second pixel 112 is configured to be a low domain correspondingly and has four alignment regions. The first pixel 111 has eight alignment regions, the display panel includes a gate scanning layer and a common line, the second pixel 112 includes a main pixel and a secondary pixel, a corresponding first pixel in the same gate scanning layer is provided with three thin film transistors, where drain electrodes of two of the thin film transistors are connected with the main pixel and the secondary pixel respectively, and source electrodes are connected with the same data line; and a source electrode of another one of the thin film transistors is connected with the secondary pixel in the previous gate scanning layer, and a drain electrode is connected with the common line. Thin film transistors in the same gate scanning layer are opened at the same time, the main pixel and the secondary pixel are charged at the same time, and charge amounts of the main pixel and the secondary pixel are the same; and when a switch of a thin film transistor in the previous layer is turned off, a thin film transistor in the next layer is turned on, since the secondary pixel in the previous layer has an overlapping area with a common electrode and thus produces a discharging capacitance, the electric quantity of the secondary pixel may lose, and at this point, the voltage of the main pixel is greater than the voltage of the secondary pixel, and the luminance of the secondary pixel is lower than the luminance of the main pixel. According to the characteristics of a VA type, when dimensions of the display panel 110 are large, the luminance on both sides may be larger when viewing from different view angles, so that the circumstance of non-uniform luminance and darkness may occur. The pixel is configured to be a high domain correspondingly so as to perform cooperation, with one that is of higher luminance on both sides cooperating with one that is of lower luminance, thereby alleviating the color shift. The second pixel 112 has four alignment regions, which improves the transmittance compared with the circumstance of providing eight alignment regions.

As another embodiment of this application, with reference to FIG. 7, disclosed is a manufacturing method for a display panel 110, including:

S91: providing a pixel electrode of the first pixel 111 and a pixel electrode of the second pixel 112 on a first substrate of the display panel 110, where the electrode of the first pixel 111 provided includes pixel electrodes of a main pixel and a secondary pixel; two thin film transistors are provided on the first substrate; one thin film transistor is connected with the main pixel so as to charge the main pixel; and the other thin film transistor is connected with the secondary pixel so as to charge the secondary pixel, and providing a color photoresist layer corresponding to the first pixel 111 and the second pixel 112 on a second substrate of the display panel 110, where the color photoresist layer and a pixel electrode layer, of course, may also be arranged on the same substrate; and S92: providing a plurality of first pixels 111 and a plurality of second pixels 112, where colors corresponding to the first pixel 111 and the second pixel 112 differ from each other, and where the first pixel 111 is configured to be a high domain, the second pixel 112 is configured to be a low domain, and the number of alignment regions of the high domain is greater than the number of alignment regions of the low domain.

In this solution, the display panel 110 includes a first pixel 111 and a second pixel 112, both of which are multiple, the first pixel 111 is configured to be a high domain correspondingly, and the second pixel 112 is configured to be a low domain correspondingly. Since the number of alignment regions of the first pixel 111 differs from that of the second pixel 112, for the solution that both the first pixel 111 and the second pixel 112 are configured to be high domains, the number of alignment regions of the high domain is larger, a view angle configured for the high domain is good, and the configuration of high domain may reduce an opening area and thus sacrifice an aperture ratio; and for the solution that both the first pixel 111 and the second pixel 112 are configured to be low domains, the configuration of low domain enables the opening area to be relatively larger and thus the aperture ratio to be higher, but the view angle may be worse, and the customer experience may be poor. In this solution, the high domain and the low domain are configured in a mixed and cooperated manner, the configuration of low domain guarantees certain transmittance, while the configuration of high domain alleviates the problem of color shift at a large view angle, so that the high domain and the low domain are provided in a mixed and cooperated manner, thereby alleviating the color shift and improving the quality of the display panel 110 in the case of the large view angle of a product while ensuring certain transmittance. The number of alignment regions of pixels in the same row or column is the same, the same row or column of a mask is of the same number of alignment regions and the same pattern, and the design of the mask is simpler.

As another embodiment of this application, with reference to FIG. 8, disclosed is a display device 100, including any display panel 110 as mentioned above.

In this solution, the display panel 110 includes a first pixel 111 and a second pixel 112, both of which are multiple, the first pixel 111 is configured to be a high domain correspondingly, and the second pixel 112 is configured to be a low domain correspondingly. Since the number of alignment regions of the first pixel 111 differs from that of the second pixel 112, for the solution that both the first pixel 111 and the second pixel 112 are configured to be high domains, the number of alignment regions of the high domain is larger, a view angle configured for the high domain is good, and the configuration of high domain may reduce an opening area and thus sacrifice an aperture ratio; and for the solution that both the first pixel 111 and the second pixel 112 are configured to be low domains, the configuration of low domain enables the opening area to be relatively larger and thus the aperture ratio to be higher, but the view angle may be worse. In this solution, the high domain and the low domain are configured in a mixed and cooperated manner, the configuration of low domain guarantees certain transmittance, while the configuration of high domain alleviates the problem of color shift at a large view angle, so that the high domain and the low domain are provided in a mixed and cooperated manner, thereby alleviating the color shift and improving the quality of the display panel 110 in the case of the large view angle of a product while ensuring certain transmittance. The number of alignment regions of pixels in the same row or column is the same, the same row or column of a mask is of the same number of alignment regions and the same pattern, and the design of the mask is simpler.

It should be noted that the sequence numbers of steps involved in a specific solution should not be considered as limiting the order of steps as long as the implementation of this solution is not affected. The steps appearing earlier may be executed earlier than, later than, or at the same time as those appearing later. Such implementations shall all be considered as falling within the protection scope of this application as long as this solution can be implemented.

The display panel of this application may be a twisted nematic (TN) panel, an in-plane switching (IPS) panel, or a multi-domain vertical alignment (VA) panel, and may certainly be any other suitable type of panel.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising:
    a plurality of first pixels and a plurality of second pixels, wherein colors of the first pixel differ from colors of the second pixel; and
    the first pixel is configured to be a high domain, the second pixel is configured to be a low domain, and the number of alignment regions of the high domain is greater than the number of alignment regions of the low domain;
    wherein the display panel comprises a gate scanning layer and a common line, the second pixel comprises a main pixel and a secondary pixel, and a corresponding first pixel in the same gate scanning layer is provided with three thin film transistors, wherein drain electrodes of two of the thin film transistors are connected with the main pixel and the secondary pixel respectively, and source electrodes are connected with the same data line; and a source electrode of another one of the thin film transistors is connected with the secondary pixel in the previous gate scanning layer, and a drain electrode is connected with the common line.

2. The display panel according to claim 1, wherein the luminance of the first pixel is lower than the luminance of the second pixel.

3. The display panel according to claim 2, wherein the first pixel comprises a blue pixel, which is the first pixel and configured to be a high domain correspondingly.

4. The display panel according to claim 2, wherein the display panel further comprises a third pixel, which is configured to be a low domain correspondingly; and
the first pixel is a blue pixel, the second pixel is a red pixel, the third pixel is a green pixel, the blue pixel is configured to be a high domain correspondingly, the red pixel is configured to be a low domain correspondingly, and the green pixel is configured to be a low domain correspondingly.

5. The display panel according to claim 2, wherein the display panel further comprises a third pixel, which is configured to be a high domain correspondingly; and
the first pixel is a blue pixel, the second pixel is a red pixel, the third pixel is a green pixel, the blue pixel is configured to be a high domain correspondingly, the red pixel is configured to be a low domain correspondingly, and the green pixel is configured to be a high domain correspondingly.

6. The display panel according to claim 1, wherein the display panel comprises a third pixel and a fourth pixel, which are configured to be low domains correspondingly.

7. The display panel according to claim 6, wherein the first pixel is a white pixel, the second pixel is a red pixel, the third pixel is a green pixel, the fourth pixel is a blue pixel, and colors of pixels in the same column are the same.

8. The display panel according to claim 6, wherein the first pixel, the second pixel, the third pixel, and the fourth pixel belong to a pixel group with two rows and two columns, and in each pixel group, the second pixel and the third pixel are in the same column, the first pixel and the fourth pixel are in the same column, the second pixel and the fourth pixel are in the same row, and the first pixel and the third pixel are in the same row.

9. The display panel according to claim 6, wherein the first pixel, the second pixel, the third pixel, and the fourth pixel belong to a pixel group with two rows and two columns, and in each pixel group, the second pixel and the third pixel are in the same row, the first pixel and the fourth pixel are in the same row, the second pixel and the fourth pixel are in the same column, and the first pixel and the third pixel are in the same column.

10. The display panel according to claim 6, wherein the first pixel, the second pixel, the third pixel, and the fourth pixel belong to a pixel group, and in each pixel group, the first pixel, the second pixel, the third pixel, and the fourth pixel are in the same row.

11. The display panel according to claim 1, wherein the low domain has four alignment regions, and the high domain has eight alignment regions.

12. A manufacturing method for a display panel, the display panel comprising a plurality of first pixels and a plurality of second pixels, and the manufacturing method comprising a step of:
providing a plurality of first pixels and a plurality of second pixels, wherein colors corresponding to the first pixel and the second pixel differ from each other, and wherein the first pixel is configured to be a high domain, the second pixel is configured to be a low domain, and the number of alignment regions of the high domain is greater than the number of alignment regions of the low domain;
wherein the display panel comprises a gate scanning layer and a common line, the second pixel comprises a main pixel and a secondary pixel, and a corresponding first pixel in the same gate scanning layer is provided with three thin film transistors, wherein drain electrodes of two of the thin film transistors are connected with the main pixel and the secondary pixel respectively, and source electrodes are connected with the same data line; and a source electrode of another one of the thin film transistors is connected with the secondary pixel in the previous gate scanning layer, and a drain electrode is connected with the common line.

13. The manufacturing method for a display panel according to claim 12, wherein the step of providing a plurality of first pixels and a plurality of second pixels comprises:
providing a pixel electrode of the first pixel and a pixel electrode of the second pixel on a first substrate of the display panel; and
providing a color photoresist layer corresponding to the first pixel and the second pixel on a second substrate of the display panel.

14. A display device, comprising a display panel, the display panel comprising:
a plurality of first pixels and a plurality of second pixels, wherein colors of the first pixel differ from colors of the second pixel; and
the first pixel is configured to be a high domain, the second pixel is configured to be a low domain, the number of alignment regions of the high domain is greater than the number of alignment regions of the low domain, and the luminance of the first pixel is lower than the luminance of the second pixel;
wherein the display panel comprises a gate scanning layer and a common line, the second pixel comprises a main pixel and a secondary pixel, and a corresponding first pixel in the same gate scanning layer is provided with three thin film transistors, wherein drain electrodes of two of the thin film transistors are connected with the main pixel and the secondary pixel respectively, and source electrodes are connected with the same data line; a source electrode of another one of the thin film transistors is connected with the secondary pixel in the previous gate scanning layer, and a drain electrode is connected with the common line; and the low domain has four alignment regions, and the high domain has eight alignment regions.

15. The display device according to claim 14, wherein the display panel comprises a blue pixel, which is the first pixel and configured to be a high domain correspondingly.

16. The display device according to claim 14, wherein the display panel further comprises a third pixel, which is configured to be a low domain correspondingly; and
the first pixel is a blue pixel, the second pixel is a red pixel, the third pixel is a green pixel, the blue pixel is configured to be a high domain correspondingly, the red pixel is configured to be a low domain correspondingly, and the green pixel is configured to be a low domain correspondingly.

17. The display device according to claim 14, wherein the display panel further comprises a third pixel, which is configured to be a high domain correspondingly; and the first pixel is a blue pixel, the second pixel is a red pixel, the third pixel is a green pixel, the blue pixel is configured to be a high domain correspondingly, the red pixel is configured to be a low domain correspondingly, and the green pixel is configured to be a high domain correspondingly.

18. The display device according to claim 14, wherein the display panel comprises a third pixel and a fourth pixel, the third pixel and the fourth pixel are configured to be low domains correspondingly, the first pixel is a white pixel, the second pixel is a red pixel, the third pixel is a green pixel, the fourth pixel is a blue pixel, and colors of pixels in the same column are the same.

* * * * *